US007975004B2

(12) United States Patent
Dussaume et al.

(10) Patent No.: US 7,975,004 B2
(45) Date of Patent: Jul. 5, 2011

(54) METHOD FOR THE TRANSMISSION OF INFORMATION WITH IMPROVED PERENNIALITY

(75) Inventors: Philippe Dussaume, Lannion (FR); Yvon Guillot, Trebeurden (FR); Jean-Louis Cheviet, Sainte Croix de Beaumont (FR)

(73) Assignee: France Telecom, Paris (FR)

( * ) Notice: Subject to any disclaimer, the term of this patent is extended or adjusted under 35 U.S.C. 154(b) by 424 days.

(21) Appl. No.: 12/065,804

(22) PCT Filed: Aug. 30, 2006

(86) PCT No.: PCT/EP2006/008485
§ 371 (c)(1),
(2), (4) Date: Sep. 8, 2008

(87) PCT Pub. No.: WO2007/028533
PCT Pub. Date: Mar. 15, 2007

(65) Prior Publication Data
US 2009/0216890 A1    Aug. 27, 2009

(30) Foreign Application Priority Data
Sep. 5, 2005    (FR) ...................................... 05 09043

(51) Int. Cl.
*G06F 15/16* (2006.01)
(52) U.S. Cl. .............................. 709/203; 709/229; 726/3
(58) Field of Classification Search .................. 709/203, 709/229; 726/3
See application file for complete search history.

(56) References Cited

U.S. PATENT DOCUMENTS

| 6,785,728 B1 * | 8/2004 | Schneider et al. ............ 709/229 |
| 6,832,254 B1 * | 12/2004 | Scoggins et al. .............. 709/227 |
| 2007/0025541 A1 * | 2/2007 | Mohler ..................... 379/220.01 |

FOREIGN PATENT DOCUMENTS

WO    WO 01/45341 A2    6/2001

OTHER PUBLICATIONS

Lee, J.H. "Supporting Multi-User, Multi-Applet Workspaces in CBE." Software Systems Research Laboratory. Dept. of Electrical Engineering and Computer Science. The University of Michigan, 1996. pp. 344-353.
Petitcolas, F. "WebGroup: A Secure Group Access Control Tool for the World-Wide Web." Computer Laboratory, University of Cambridge. United Kingdom, 1998.
French Search Report from counterpart foreign Application No. FR 05/09043 dated Jun. 7, 2008.

* cited by examiner

*Primary Examiner* — Ario Etienne
*Assistant Examiner* — El Hadji Sall
(74) *Attorney, Agent, or Firm* — David D. Brush; Westman, Champlin & Kelly, P.A.

(57) ABSTRACT

A method is provided for the transmissions of information between at least a first and a second communication means. The method includes in saving at least one set of information in an intermediate element. The method also includes defining a plurality of client groups, using an identifier in order to designate at least one group of clients that are authorized to access the information set, and at least one filtering step, which is intended to prevent a user that does not belong to the group from accessing the information. The method enables the integrity of the contained in the intermediate element to be substantially secured, by selecting clients that are authorized to access the information.

9 Claims, 5 Drawing Sheets

METHOD FOR THE TRANSMISSION OF INFORMATION WITH IMPROVED PERENNIALITY

CROSS-REFERENCE TO RELATED APPLICATIONS

This Application is a Section 371 National Stage Application of International Application No. PCT/EP2006/008485, filed Aug. 30, 2006 and published as WO2007/028533 on Mar. 15, 2007, not in English.

FIELD OF THE DISCLOSURE

The present disclosure relates to a method for the transmission of information between at least one first communications means and one second communications means including a step of storage of at least one set of information elements in an intermediate unit distinct from the first and second communications means.

Such a method is currently implemented in telecommunications systems exploited by the Applicant in order to enable transmission and temporary storage of service information formed by context or profile information relative to a user of the system, as an accompaniment to data sent out by this user. The elements which are herein called "data" usually form an essential body of the communication which is in principle initiated by said user in the prior art, this data being for example being constituted by data representing a speech signal and/or a video signal produced by the user. The information on context or profile could consist for example of a geographical location or a list of sectors of interest proper to this user.

BACKGROUND OF THE DISCLOSURE

In the prior art, a telecommunications system implementing the above-described method includes a main communications network such as a switched telephone network capable of setting up a link between a terminal made available to the user with at least one first communications means implemented by a first customer, called an upstream customer, identified as being the first intended recipient of a communications call that will have been initiated by the user, for example by keying in a predefined code on an alphanumeric keypad with which his terminal is provided. This first communications means could be for example a home-page type voice server capable of receiving a verbal request and of orienting this request, and hence the communication call in progress, to a second communications means implemented by another customer, called a downstream customer, who will have been identified by the upstream customer as a supplier of a service capable of responding to the requests formulated by the user. The term "customer" must be understood here and further below in the description as designating an entity who calls upon the resources of another entity in order to perform a task, a customer possibly taking the form of an autonomous server, a group of servers or various elements distributed separately within various communications means included in the system.

In the prior art system, when the upstream customer reorients the communication calls to the downstream customer, this upstream customer can preliminary store the service information at a particular location of a memory space included in an intermediate unit constituted by an auxiliary server and, through a signaling link planned for this purpose, send an address enabling the identification of said particular location. As it happens, this address is formed by a combination of an IP (Internet protocol) address well known to those skilled in the art, assigned to the auxiliary server, and an address of a memory port, internal to said auxiliary server, where the service information will have been effectively stored.

In the prior art, no particular precaution is planned as regards the assigning of port addresses by the auxiliary server, so that a port address could be reassigned, during a session, to a third-party customer external to the session in progress, said third-party customer then being capable, through an operation for writing new data at the port address considered, of prompting an overwriting of the service information initially stored at this port address.

Thus, the fact that any third-party customer capable of reaching the auxiliary server can request write-access thereto gives rise to considerable risks for the integrity of the information stored in said auxiliary server.

Furthermore, if a use session is defined as a sequence of successive activations of different communications means, such as for example the terminal of the user and servers implemented by the upstream and downstream customers referred to here above, the inventors have noted that, in the prior art, the pieces of service information stored by one of these communications means are linked to it and are destined to disappear very quickly after this communications means has stopped intervening in the session in progress. Now, according to the definition of the use session which is the one that the inventors propose to implement, an interruption of a communications call of one of the communications means drawn into the communications line during a use session should not prompt a break in continuity of said use session. In particular, it should be possible for a participant, whether a user or a customer, to interrupt his communications call without the use session itself being in any way thereby interrupted, and servers such as the servers implemented by the upstream and downstream customers referred to here above should be capable in such a situation of taking over and proceeding off-line to a processing of data given by the participant before calling him to give him the results of the processing operation. In known telecommunications systems, this kind of continuity of the use session in progress cannot be accompanied by a continuity of existence of the service information so that at present it is not possible to envisage the setting up of use sessions where one or more acting parties could disconnect temporarily or permanently without thereby giving rise to an interruption of the data processing system.

Thus, in general, in known telecommunications systems, there is no guarantee of the perenniality of the service information stored in the auxiliary server. Furthermore, if a participant in the course of a session orders a dynamic storage of service information additional to service information previously stored by this same participant, it is not possible to set up any link between the additional service information and the information previously stored, whereas such a link would in principle be useful for intended recipients of this information who could, for example, have to perform simultaneous processing of all the pieces of service information, and this processing would then be facilitated by a grouping together of these pieces of information.

SUMMARY

A method is provided, which includes a preliminary step of definition of a plurality of groups of customers, a step of designation by the first communications means of at least one group of customers authorized to access said set of information elements and at least one filtering step implemented by the intermediate unit in order to prevent any access to said set of information elements by a customer not belonging to said group.

An embodiment of the invention thus enables to a great extent the securing of the integrity of the information elements contained in the intermediate unit in organizing an a priori selection of the customers authorized to access said information elements.

A set of information elements may furthermore be constituted by a simple data packet, as well as by an assembly, within a frame, of a plurality of such packets. Thus, a participant may not know all the intended recipients of a frame that he has generated but is yet capable of securing each of the data packets that constitute it in designating, for each of these packets, one or more groups of customers qualified to access the packet considered.

According to a first possible mode of implementation of the invention, any access to a set of information elements stored in the intermediate unit is preceded:

by a step of identification of a sender of a request for access to said set of information elements during which said sender transmits to the intermediate unit at least one identifier of at least one group of customers to which he belongs, and a step of validation during which the group identifier transmitted by the sender of a request is compared with the identifiers of the groups of customers authorized to access said set of information elements during the designation step.

This first mode of implementation is used for performing a simple check on the intermediate unit to find out whether or not a customer wishing to access information stored in said intermediate unit has been preliminarily authorized to do so. This first mode of implementation requires each customer to know the group or groups in which he is included but prevents the intermediate unit from having to make a centralized count of the possible multiple memberships of the various customers in various groups, the only knowledge necessary being a knowledge, at the intermediate unit, of the identifiers of the groups designated as being authorized.

Alternatively or cumulatively, a second possible mode of implementation of the invention provides for a preliminary step of storage by the intermediate unit, and with reference to each group of customers defined during the definition step, of the customer identifiers included in the group considered, any access to a set of information elements stored in the intermediate unit being preceded:

by a step of identification of a sender of a request for access to said set of information elements during which said sender transmits to the intermediate unit at least one identifier proper to this sender, and a step of validation during which the identifier of the sender of a request is compared with the identifiers of the customers included in the group or groups of customers authorized to access said set of information elements during the designation step.

This second mode of implementation requires that the intermediate unit should know the composition of each group of customers. At the same time, it averts the necessity for each customer himself to know the different groups to which he may belong, sometimes without being aware of such membership through having been registered in a group for example by an administrator of an auxiliary network on which he might be dependent so that the second mode of implementation of the invention is perfectly transparent to the customers, since it does not require any particular step of group identification on their part. A systematic census of the population of groups executed in a centralized way at the intermediate unit is generally useful for efficient administration of the system inasmuch as it prevents groups of customers from being created anarchically, since only the members of the groups that are effectively counted by the intermediate unit can effectively benefit from the service for the protection of the information stored therein.

In a first variant of the invention described further above, a preliminary filtering of the storage request further improves the security of the data stored in the intermediate unit.

A first mode of implementation of this first variant is characterized in that the method described further above furthermore includes a step of qualification, in which there is designated at least one group of customers qualified to request a storage of a set of information elements within the intermediate unit, every storage of a set of information elements in the intermediate unit being preceded by:

a step of identification of a sender of a request for storage of said set of information elements during which said sender transmits to the intermediate unit at least one identifier of at least one group of customers to which the sender belongs, and a step of validation during which the group identifier transmitted by the sender of a request is compared with the identifiers of the groups of customers authorized to store a set of information elements during the qualification step.

This first mode of implementation enables the simple performance of a filtering of the request at the level of the intermediate unit but requires precise knowledge on the part of each of the customers of the group or groups to which he belongs.

A second mode of implementation of this first variant is characterized in that the method described further above furthermore includes a step of qualification, in which there is designated at least one group of customers qualified to request a storage of a set of information elements within the intermediate unit, every storage of a set of information elements in the intermediate unit being preceded by:

a step of identification of a sender of a request for storage of said set of information elements during which said sender transmits to the intermediate unit at least one identifier proper to this sender, and a step of validation during which the identifier of the sender of the request is compared with the identifiers of the customers included in the group or groups of customers authorized to store a set of information elements during the qualification step.

This second mode of implementation is made transparent for the customers at the cost of a centralized census of the populations of the different groups at the intermediate unit, such a census however being useful in itself for the administration of the system.

A method compliant with the above description may furthermore include a step of encryption of the information included in the set of information elements to be stored, said step being preferably implemented by the communications means that has sent a request for storage of the set of information elements concerned, the encryption itself being executed by using a key proper to the group of customers designated by the sender as being authorized to access said set of information elements.

An encryption step of this kind is used to boost the confidentiality of the data stored in the intermediate unit. Furthermore, assuming that the sender has computed a validation number representing the nature of the information included in the set to be stored, this sender can append this number to his storage request so that this number can also be stored in the intermediate unit. When a customer authorized to access a set of information elements considered has received and then decrypted this information by means of the key proper to his group, he can himself also compute a validation number and send it in return to the intermediate unit by way of an acknowledgment of the set of information elements considered. An intermediate unit can thus compare this new validation number with the number initially computed by the sender of the information, thus enabling a double a posteriori validation in which it is ascertained first of all that the transfer of this information has truly taken place and secondly that it has taken place in keeping with the integrity of said information.

It is another aim of an embodiment of the invention to ensure greater perenniality in time of the information stored in the intermediate unit, in proposing a method and a system of data transmission in which all the information relevant to a communications session being executed can be recognized as such especially so that, especially, it can be preserved throughout the running of said session.

Indeed, a method as described further above is characterized according to one variant of the invention in that it furthermore includes an addressing step during which at least one set of information elements intended for storage in the intermediate unit is referenced by means of an address including a session identifier, a session being defined as a sequence of successive activations of different communications means, such as for example the terminal made available to the user or the servers implemented by the upstream and downstream customers referred to further above.

An embodiment of the invention enables the marking of a set of information elements univocally by means of an identifier that will be invariable throughout the running of the session considered, said identifier being possibly protected by providing for selective transmission to groups of customers preliminarily identified as being authorized to play a part during the session considered. No element external to the session can therefore, in principle, reach or alter this information, the perenniality of which is thus ensured up to the end of a session.

In many applications, it may happen that the session identifier consists of a string of characters having a length that is too great for it to be conveyed as such on the main communications network in order to be communicated from an upstream server to a downstream server. According to one advantageous embodiment of the variants described here above, the method defined further above then advantageously includes at least:

a step for generating a call identifier designed to form part of the address assigned to a set of information elements stored in the intermediate unit and to be temporarily related to a session identifier proper to the session considered, and a step of transmission of said call identifier via a signaling link set up between two communications means.

Since the call identifier is more volatile in nature than the session identifier, inasmuch as it is useful solely for transmission between said communications means, it is possible to encode it by means of a string of characters of a length far smaller than that of the session identifier whose perenniality must be guaranteed whatever the length of the session. This smaller length enables the transmission of the call identifier by means of a signaling link which could not have been achieved by transmission of the session identifier itself.

Furthermore, although the session identifier is unique, the method according to the variant described here above enables the storage, for example dynamically, of numerous sets of information elements using numerous call identifiers which are all linked to a single session identifier, said numerous sets of information elements being thus identifiable as being linked to one another because of the relationship that all their call identifiers share with the identifier of the session in progress.

Furthermore, it must be noted that the generation step can be executed not only after but also before the session identifier considered has been generated. Indeed, it is quite possible to envisage providing for a procedure for the creation and reservation of call identifiers that would be activated by each of the communications means during its initialization, so that each communications means will subsequently have nothing more to do than to set up an association between a pre-existing call identifier and a newly created session identifier in order to generate an address designed to reference a particular set of service information elements. In such an occasion, an identifier of at least one group of customers authorized to receive this call identifier furthermore may be associated with said call identifier.

A session may take place linearly, and may then bring into play a succession of communications means in a cascade, each of these means attracting one and only one following communications means into the session. It can also be the case that a session does take place linearly. In this case a communications means, called an original communications means, could then, during the session in progress, draw not only one communications means but simultaneously at least two communications means each intended to produce a specific contribution to the data processing that has to be accomplished during the session.

The session identifiers may be generated in various ways, and by different entities included in the telecommunications system in which an embodiment of the invention is implemented. Thus, this session identifier may be generated by the terminals of a user of the system in a case in which this terminal plays the role of an initiator of the session. A session identifier may alternately be generated by a communications means other than said terminals, for example a server implemented by a customer who might have been drawn, via the main communications network, into the session initiated by this terminal. According to yet another possible alternative, this session identifier can be generated by a manager of the main communications network through which the different communications means are designed to communicate with one another. Furthermore, it is possible to envisage the storage of the session identifier in different intermediate servers, sometimes called "proxy" servers, so that this session identifier does not risk being lost in the event of an accidental break in the line of communications constituting the session in progress.

The call identifiers may themselves be generated in different ways, and by different communications means capable of coming into action in the course of a session. In a particular mode of implementation of an embodiment of the invention in which sets of information elements are intended for storage within a server capable of communicating, through a specific communications network, with different communications means designed to be activated in the course of a session, the step for generating a call identifier may advantageously be executed by said server upon a request by one of said communications means.

This mode of implementation is advantageous in that the call identifiers are all created and managed in a centralized way by an element separated from the communications means but capable of communicating with each of them. This specific server, here below called an intermediate information server, may also be capable of generating the session identifier, for example upon a request from the first communications means with which the user's terminal will have been connected.

In other modes of implementation of the invention, each communications means may be capable itself of creating a call identifier and simply informing the information intermediate server in notifying this creation to him or in asking for a data write operation at an address defined by the call identifier thus created. A decentralized generation of this kind however risks giving rise to collision between the write commands coming from the different communications means that have separately designated a same address defined by identical call identifiers.

According to one of its hardware aspects, an embodiment of the invention, as a product directly obtained by the implementation of the method described further above, also concerns a signal intended for transmission within a telecommunications system capable of ensuring a transmission of information between at least one first communications means and one second communications means through an intermediate unit distinct from said communications means, said signal being a carrier of a request for storage of a set of information elements within a memory included in the intermediate unit and including a field representing at least one identifier of a group of customers authorized to access said set of information elements.

According to one of its hardware aspects, an embodiment of the invention also relates to a telecommunications system capable of carrying out a transmission of information between at least one first communications means and one second communications means furthermore including an intermediate unit distinct from the first and second communications means provided with means for storage of at least one set of information elements, characterized in that the system includes means of filtering capable of being implemented by the intermediate unit in order to prevent any access to said set of information elements by a user not belonging to a population preliminarily designated by one of the communications means as being authorized to access said set of information elements.

According to another of its hardware aspects, an embodiment of the invention, by way of a means useful for its implementation, furthermore pertains to a data server designed to be included in a telecommunications system capable of providing for a transmission of information between a first communications means and a second communications means, said data server being provided with means for the storage of at least one set of information elements and filtering means capable of preventing any access to said set of information elements on the part of a customer not belonging to a population preliminarily designated by one of the communications means as being authorized to access said set of information elements.

According to another of its hardware aspects, an embodiment of the invention, by way of a means useful to the implementation of a telecommunications system compliant with the above description, pertains to a data carrier designed to be included in an intermediate unit through which at least one set of data elements is intended for transmission between at least one first communications means and one second communications means, said data carrier is provided with means to inhibit any read access or write access concerning said set of information by a customer not belonging to a population preliminarily designated by one of the communications means as being authorized to access said set of information elements.

BRIEF DESCRIPTION OF THE DRAWINGS

The characteristics referred to here above as well as other characteristics shall appear more clearly from the following description of an exemplary embodiment, said description being made with reference to the appended drawings, of which.

DETAILED DESCRIPTION OF ILLUSTRATIVE EMBODIMENTS

Figure 1:
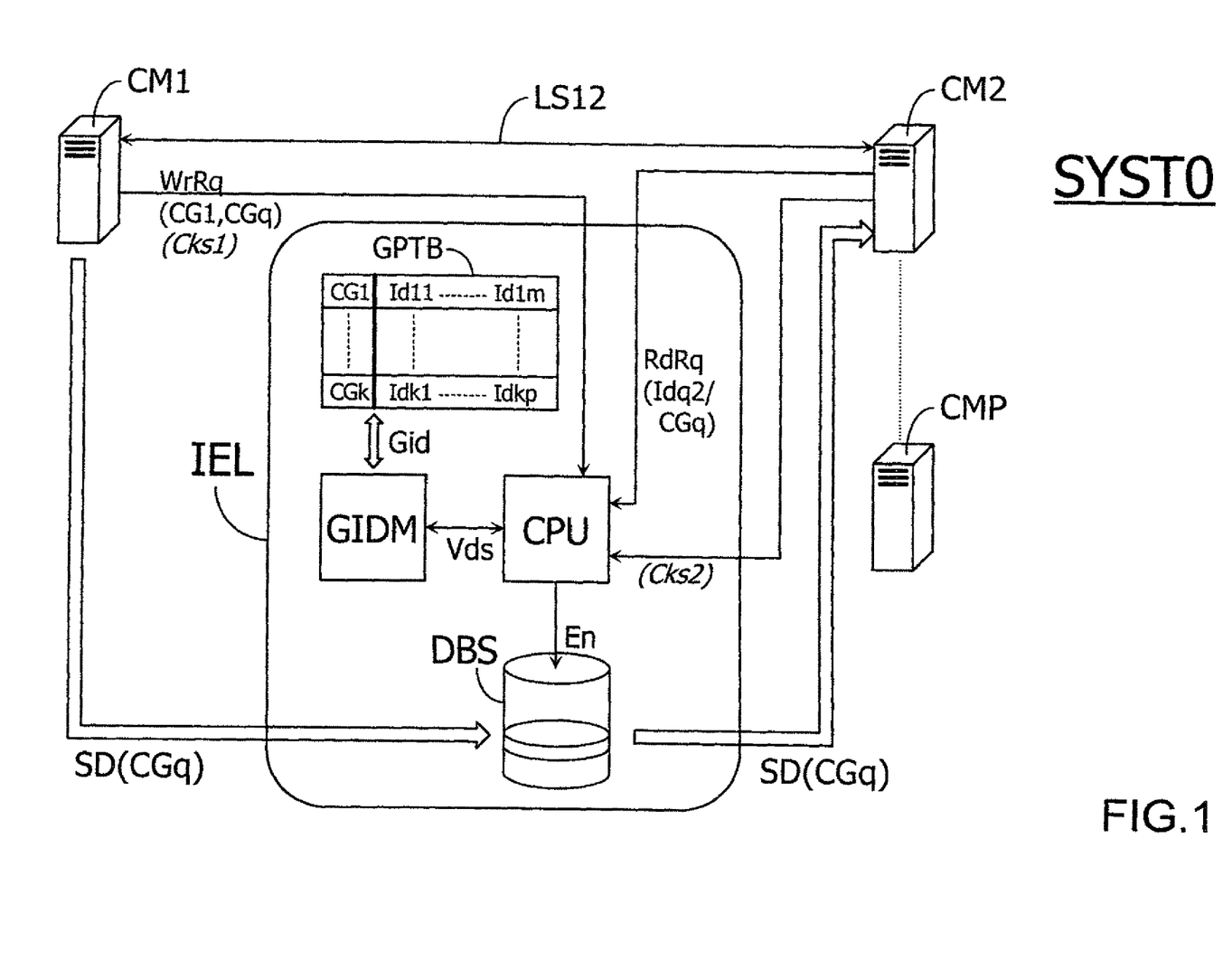
FIG. 1 is a functional diagram representing the telecommunications system in which a method according to an embodiment of the invention is implemented.

FIG. 1 is a schematic view of a telecommunications system SYST0 including a plurality of communications means CM1, CM2, ..., CMP capable of communicating with one another through data links which will be set up, for example, within a main communications network formed by an RTC type switched telephony network, the system SYST0 being furthermore provided with means to implement a transmission method compliant with an embodiment of the invention. In the example described herein, the system SYST0 is dedicated to providing for transmission between data servers forming first and second communications means CM1 and CM2 implemented by the upstream and downstream customers. The term "customer" herein designates an entity drawing upon the resources of another entity in order to perform a task, each customer in this particular example implementing an autonomous server that forms one of the communications means CM1, CM2, ..., CMP.

In compliance with an embodiment of the present invention, the system SYST0 includes filtering means (CPU, GIDM, GPTB) that can be implemented by the intermediate unit IEL in order to prevent any access to one or more sets of information elements SD on the part of customers that do not belong to a population preliminarily designated as being authorized to access this set or these sets of information elements SD.

Indeed, according to an embodiment of the present invention, when the first communications means CM1 wishes to transmit a set of information elements SD to the second communications means CM2, it sends a storage request WrRq(CG1,CGq) to an intermediate unit IEL for the purpose of effecting a storage of said set SD within a storage medium herein taking the form of a database DBS which could be not unique and could include for example one or more hard disk drives or optical disks. This storage request WrRq(CG1,CGq) in this example includes an identifier CG1 designating a group of customers including the one that implements the first communications means CM1 as well as at least one other group identifier CGq designating a population of customers authorized to subsequently access the set of information elements SD, wherein the population must include the customer who implements the second communications means CM2. The first communications means CM1 could then inform the second communications means CM2, via a signaling link LS12, of the presence within the intermediate unit IEL of information elements intended for the second communications means CM2.

In the mode of implementation of an embodiment of the invention represented herein, the intermediate unit IEL includes a group census table GPTB in which preliminary storage has been made, with reference to each group of customers CG1, . . . , CGk, of customer identifiers (Id11, . . . , ID1m) . . . (Idk1, . . . , Idkp) respectively included in the group considered. Any access by the second communications means CM2 to the set of information elements SD stored in the database DBS will in principle be authorized by the intermediate unit IEL only after reception of a read request RdRq (Idq2/CGq) from said second communications means CM2 through which this second communications means CM2 makes transmission to the intermediate unit of at least one individual identifier Idq2 proper to this sender and/or at least one identifier CGq proper to at least one group of customers to which this second communications means CM2 belongs.

The effective access to the set of information elements SD could then be preceded by a validation step during which the identifier Idq2 of the sender of the request is compared with the identifiers of the customers included in the group of customers designated by the group identifier CGq. A validation of this kind will be executed by a central processing unit CPU which will receive the individual identifier Idq2 and/or the group identifier CGq and transmit its content to an identifier management module GIDM of the computation table GPTB capable of exchanging identifier carrier signals Gid with said table, said identifier management module GIDM transmitting a validation signal Vds in return to the central processing unit CPU in the event of correspondence between the individual identifier and/or the group identifier defining the population of intended recipients capable of accessing the set of information elements SD and the individual identifier Idq2 and/or the group identifier CGq transmitted by the second communications means CM2. On such an assumption, the central processing unit CPU will deliver an authorization signal En which will enable the dispatch of this set of information elements SD to said second communications means CM2.

This mode of implementation requires that the intermediate unit IEL should know the composition of each group of customers CG1, . . . , CGk but averts the need for each of these customers to know the possible different groups to which they may belong, so that this mode of implementation of the invention is perfectly transparent to customers, inasmuch as it requires no particular step of group identification on their part.

The systematic counting of the population of the groups within the GPTB table executed in a centralized way at the level of the intermediate unit IEL will furthermore be generally useful for efficient administration of the system SYST0 inasmuch as it prevents groups of customers from being created anarchically, since only the members of the group who have been effectively counted by the intermediate unit IEL could effectively benefit from the service of the protection of the information that will be stored therein. The content of the GPTB table could furthermore be advantageously updated dynamically, for example using successive, periodic or non-periodic consultations of one or more third-party databases not illustrated in the present drawing.

The fact of requiring that the first communications means CM1 should include, in its storage request WrRq(CG1,CGq), at least one CGI identifier within a group to which it belongs furthermore enables the execution of a preliminary filtering of the storage requests which will enable any further improvement of the security of the data stored in the intermediate unit, the central processing unit CPU being thus capable of verifying, with the identifier management module GIDM of the counting table GPTB, that said first communications means truly forms part of a population qualified to record information in the database DBS.

It is optionally possible to plan to routinely include in the population of customers qualified to access the set of information elements SD all the members of the group of customers CG1 to which the communications means CM1 having sent out the storage request WrRq(CG1,CGq) belongs, or only the customer implementing said communications means CM1 himself in order to give said communications means CM1 the possibility of subsequently consulting the set of information elements SD to know whether it has been modified, to check its integrity or on the contrary, to carry out a modification of the data included in said set SD.

Finally, it can be planned to have an encryption of the information included in the set to be memorized SD. This encryption will preferably be executed in the example described herein by the first communications means CM1 in using a key proper to the group of customers designated by the sender as being authorized to access said set of information elements SD by means of the group identifier CGq.

An encryption of this kind reinforces the confidentiality of the data stored in the intermediate unit IEL. Furthermore, assuming that the first communications means CM1 will have computed a validation number Cks1 representing the nature of the information included in the set to be memorized SD, the first communications means CM1 could append this number Cks1 to its storage request WrRq(CG1,CGq) so that this number Cks1 could also be stored in the intermediate unit IEL, for example within the module for the management of identifiers GIDM of the counting table GPTB. When a user authorized to access the set of information elements SD has received and then decrypted this information by means of the key proper to its group, he can also compute a validation number Cks2 and send it in return to the intermediate unit IEL as an acknowledgment for the set of information elements SD considered. The central processing unit CPU can then execute a comparison between this new validation number Cks2 and the number Cks1 initially computed by the sender of the information, in order to make an a posteriori check that the transfer of the set of information SD has been made in compliance with integrity.

In order to enable an even more complete administration of the system, the GPTB table could advantageously dynamically store attributes in association with each customer group identifier CG1, . . . , CGk which will represent rights that may or may not be enjoyed by the members of the group considered. It will thus be possible to make centralized verification of whether a given customer belongs to a group whose members are generally authorized or not authorized to access the system SYST0, store data in the intermediate unit IEL, read data from the intermediate unit IEL, etc.

Figure 2:
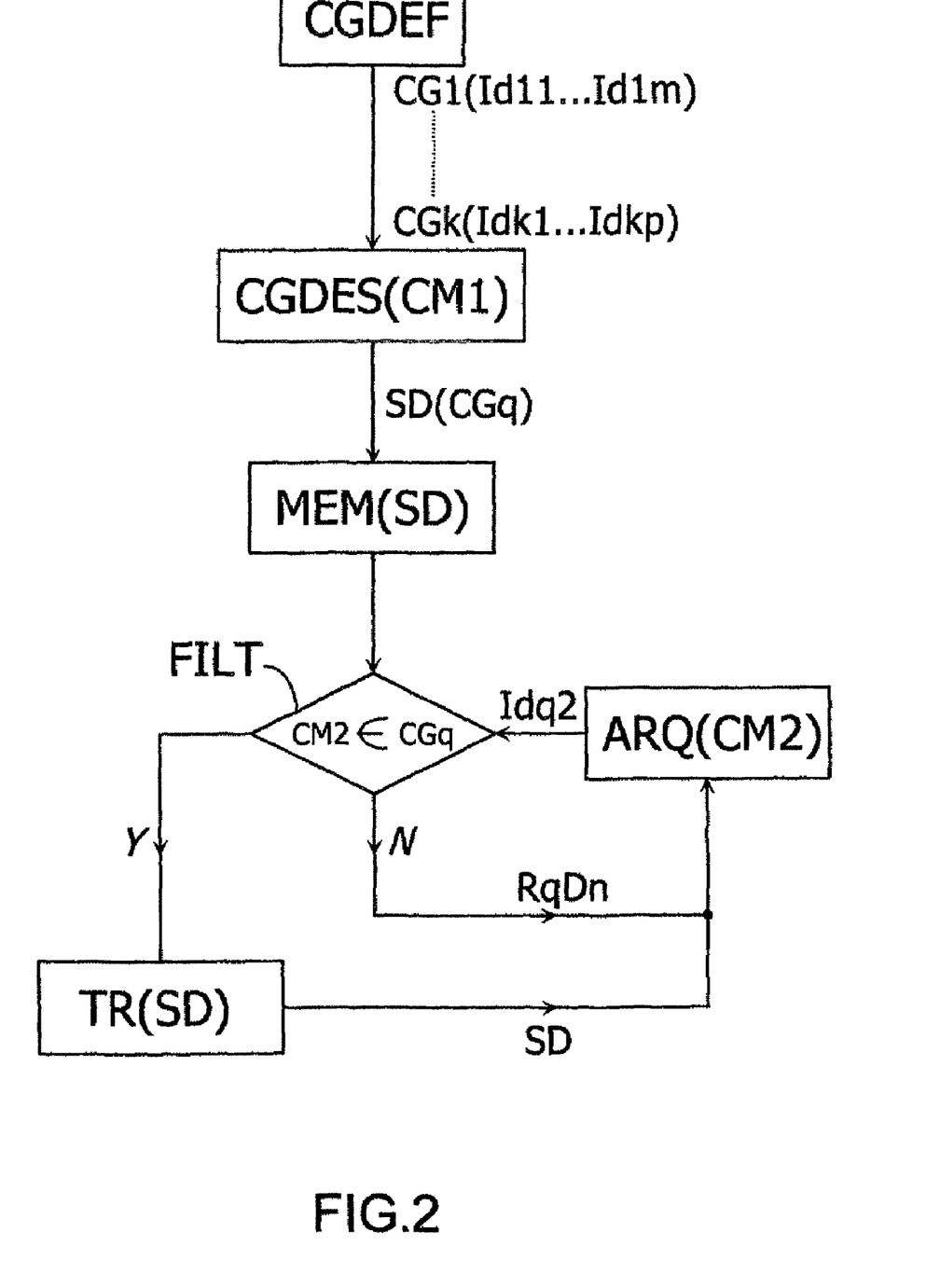
FIG. 2 is a diagram of steps that schematically represent a method according to an embodiment of the invention.

FIG. 2 gives a schematic view of a method according to an embodiment of the invention that is implemented in the telecommunications system described here above. This method includes an initial step CGDEF for the definition of a plurality of groups of customers CG1, . . . , CGk that respectively includes sets of customers individually referenced by means of their identifiers (Id11, . . . , Id1m) . . . (Idk1, . . . , Idkp). This method includes a following step CGDES of designation by a first communications means CM1 within a group CGq of customers authorized to access a set of information SD(CGq) produced by this first communications means CM1, and intended for storage within the intermediate unit during a next step MEM(SD) of storage of the set of information SD(CGq).

During an incident step ARQ(CM2), a second communications means CM2 provided with an identifier Idq2 requests the intermediate unit for an access to the set of information SD(CGq) previously stored therein. The intermediate unit then implements a filtering step FILT during which said intermediate unit ascertains that the second communications means CM2 truly belongs to the group CGq of customers authorized to access the set of information SD(CGq). If this is not so, the intermediate unit sends a message RqDn in return rejecting the request for access sent out by the second communications means CM2. If, on the contrary, it is established at the end of the filtering step FILT that the second communications means CM2 truly belongs to the group CGq of the customers authorized to access the set of information SD(CGq), the intermediate unit executes a following step TR(SD) for transmission of said set of information SD(CGq) to said second communications means CM2. The intermediate unit is thus capable of preventing any access to said set of information SD(CGq) by a customer who does not belong to the group of customers CGq selected by the first communications means CM1 during the designation step CGDES.

Figure 3:
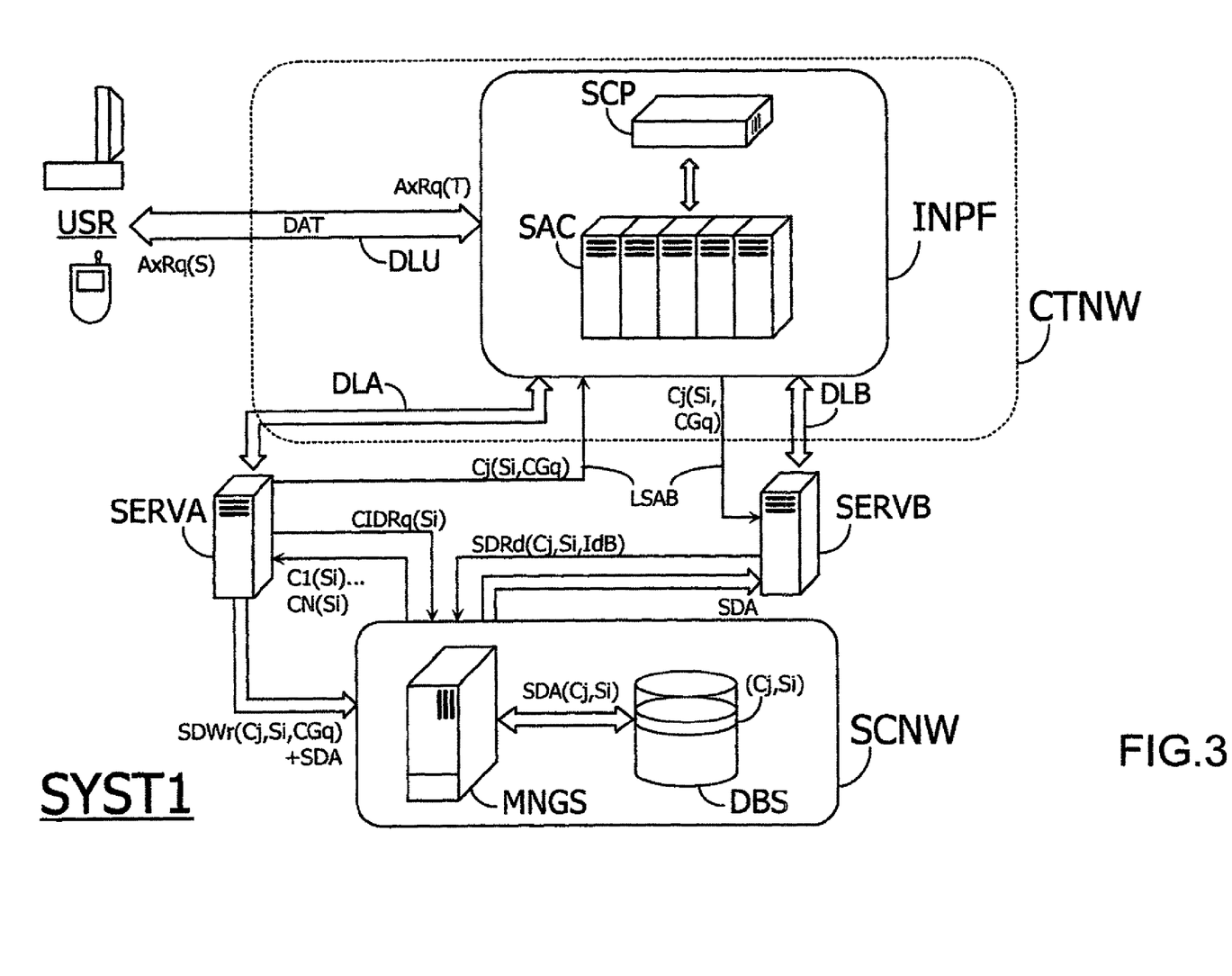
FIG. 3 is a functional diagram representing a possible mode of operation of a telecommunications system in which a method according to a variant of the invention is implemented.

FIG. 3 gives a schematic view of a telecommunications system SYST1 provided with means to implement a variant of a method of transmission complying with an embodiment of the invention. This system SYST1 is designed to provide for data transmission DAT between a terminal, for example a radiotelephone, a personal organizer provided with transmission/reception functions or again a microcomputer or multimedia panel made available to a user USR of the system SYST1 and a multiplicity of communications means, in the example described here data servers SERVA and SERVB implemented by upstream and downstream customers, and respectively named here below upstream and downstream servers SERVA and SERVB, all these communications means being capable of communicating with one another through data links DLU, DLA and DLB set up within a main communications network formed by an RTC type switched telephony network CTNW. In the mode of implementation of an embodiment of the invention represented here, the terminal is capable of sending out an access request AxRq(T) containing instructions identifying a service defined by the user USR using for example an alphanumeric keyboard, a graphic interface or a voice control tool. After having studied the instructions contained in the access request AxRq(T), an intelligent network platform INPF will route the data DAT sent out by the terminal to the user USR to the upstream data server SERVA which will have been identified by the platform INPF as being best capable of responding to the request sent out by the user USR and therefore as a first recipient of the communication that would have been initiated by the user USR. The intelligent network platform INPF usually includes an access switch SAC driven by a service control point SCP and is itself well known to those skilled in the art so that it shall not be described in greater detail here below.

When the upstream server SERVA receives the data DAT from the terminal of the user, it simultaneously receives service information pertaining to said data DAT and must see to its integrity, as well as its storage as the case may be. Indeed, it can often happen that upstream server SERVA is not capable by itself of carrying out an exhaustive processing of the request AxRq(T) sent out by the user USR, in which case said upstream server SERVA must make use of another server SERVB, called a downstream server, to process certain aspects of this request. On such an assumption, the upstream server SERVA will inform the platform INPF of the need for action by the downstream server SERVB which will then be acted upon by said platform INPF and will have the data that it has to process sent to it by the upstream server SERVA. For example, the upstream server SERVA could support a service for the supply of general information and receive a request from the user USR for the purposes of getting connected to a philatelic club close to his geographical location, which is included in the service information. The downstream server SERVB corresponding to the target philatelic club will then be drawn into the communications server in progress with a view to meeting the request of the user USR. The successive instances of linking of the terminal of the user USR with the upstream server SERVA and then of the upstream server SERVA with the downstream server SERVB is recorded in a same sequence of successive activations of communications means and are therefore included in a same communications session. It is furthermore quite realistic to envisage a situation where the user USR has put an end to his connection call in the meantime with the main data network CTNW and that the upstream and downstream servers SERVA and SERVB continue all the same to process the request AxRq(T) initially sent out by this user USR. At the end of the processing process, the downstream server SERVB or the upstream server SERVA could in turn request a connection with the terminal of said user USR using an access request AxRq(S) sent to the main communications network CTNW in order to restitute, to this user USR, the result of the processing of his initial request AxRq(T); all the above-described communications then still form part of the context of the same communications session although the user USR has been temporarily absent. In other modes of implementation of the invention, the upstream server SERVA could furthermore be led to draw a terminal in place of the downstream server SERVB into the communications session in progress, in particular a terminal other than the one made available to the user USR.

In the mode of implementation of an embodiment of the invention represented here, when the upstream server SERVA has received the initial request AxRq(T) and has deduced therefrom that the intervention of a downstream server is at least partially needed for the processing of said request, this upstream server SERVA will set up a communications call with an intermediate information server MNGS in order to organize a specific addressing of the service information received in parallel with this initial request AxRq(T). This communications call will take the form of a request CIDRq (Si) for at least one call identifier linked to the session in progress which will have been preliminarily identified by means of a session identifier Si defined either by the intelligent network platform INPF or by the upstream server SERVA. In other embodiments of the invention, the upstream server SERVA could also request the intermediate information server MNGS to define the session identifier Si. The intermediate information server MNGS is herein capable of communicating through a specific communications network SCNW, for example a dedicated Intranet type network, with the different communications means designed to be activated during a session. In response to the call identifier request CIDRq(Si), the intermediate information server MNGS in this example gives the upstream server SERVA a plurality of call identifiers CI(Si), . . . , CN(Si) all linked to the same session identifier Si. In other modes of implementation of the invention, the call identifiers C1, ..., CN could be generated in a group without in anyway thereby being linked beforehand to a particular session. The upstream server SERVA can then send the intermediate information server MNGS a storage request SDWr(Cj,Si,CGq) in order to obtain a storage, at an address defined by a conjunction of the call identifier Cj, with the session identifier Si, of a set SDA of service information designed for a downstream server which ought not to be authorized to access service information unless it belongs to the group of customers designated by the identifier CGq. The intermediate information server MNGS then operates this storage in a data carrier, in this case a database DBS including for example a hard disk drive or an optical disk, at an address simultaneously including the call identifier Cj and the session identifier Si. In this particular example of an implementation of the invention, the upstream server SERVA will then associate the group identifier CGq with this call identifier Cj in order to make sure that only the customers belonging to the group of customers corresponding to this identifier CGq could receive the call identifier then noted Cj(Si,CGq) which will be transmitted to the downstream server SERVB via a signaling link LSAB set up by means of the main communications network CTNW. As a result, when the downstream server SERVB receives a request from the platform INPF for intervention in the session in progress, said downstream server SERVB will simultaneously, through the signaling link LSAB, receive an address at which, provided that it is a member of the group of customers identified by the identifier CGq, it can retrieve the service information stored at the prompting of the upstream server SERVA. The downstream server SERVB will then send out a read request SDRd (Cj,Si,IdB) to the intermediate information server MNGS, and in return receive a communications call from the set SDA of service information initially stored upon a command of the upstream server SERVA, to the address defined by the call identifier linked with the session identifier (Cj,Si). This will be done on the prior condition that the identifier IdB of the downstream server SERVB is truly included in the list of customer identifiers belonging to the group designated by the identifier CGq within a census table included in the intermediate information server MNGS in accordance with the above description.

In the above example, a single call identifier Cj(Si) will have been used, but it must be clearly understood that the upstream server SERVA has, in this particular mode of implementation of the invention, the possibility of storing a number N of sets SDj (for j=1 to N) of service information elements, each possibly being identified by means of a call identifier Cj (for j=1 to N) which will be proper to it in this example, giving the system SYST1 great flexibility of use, since the storage can then be done dynamically, and hence at any time, even after a user USR has got disconnected from the main communications network CTNW. Similarly, the downstream server SERVB could itself also be assigned call identifiers linked to the identifier Si of the session in progress, in order in turn to control a storage of service information identical to or different from the set SDA that it has received from the upstream server SERVA. Said information could be intended for other servers positioned downstream from the downstream server SERVB but could also be intended for communications means situated upstream, for example the upstream server SERVA or the terminal of the user USR.

Furthermore, since it is planned, in certain modes of implementation of the invention, to associate customer group identifiers with session identifiers and/or with call identifiers, it is possible to set up and dynamically manage, within the intermediate information server MNGS, a list of rights generally assigned to each group or sub-group of customers recorded therein. Among these general rights, there could be especially the right to receive communications and/or to use session identifiers in general or only certain predefined session identifiers in order to be able to intervene in one of these sessions. These general rights could also include a right to receive communication of and/or use session identifiers in general or only certain predefined session identifiers, in order to be able to intervene in one of these sessions. These general rights could also include a right to receive communication of and/or use call identifiers in general or only certain predefined call identifiers These general rights could again include a right to create call identifiers in general or only certain predefined call identifiers.

Figure 4:
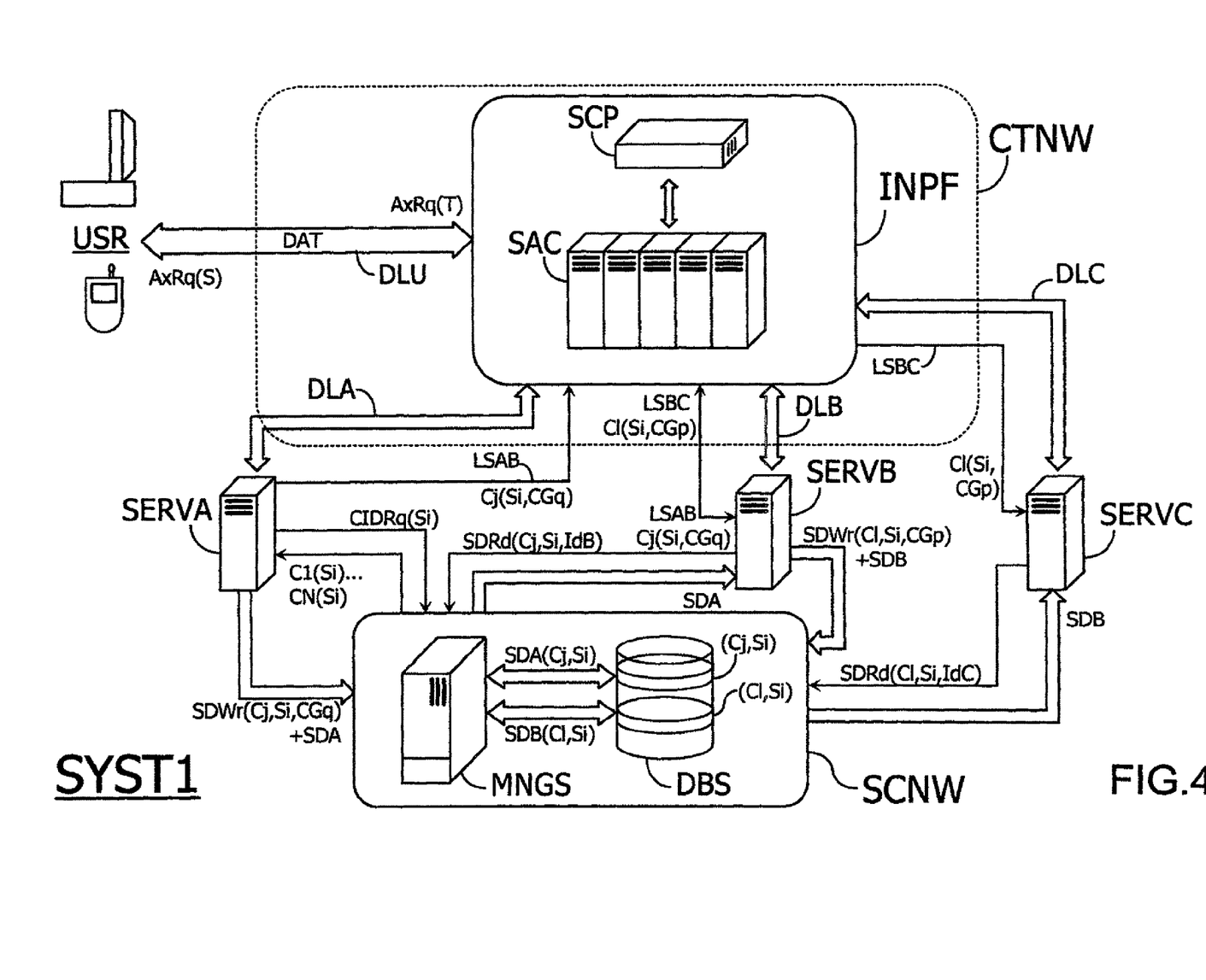
FIG. 4 is a functional diagram representing a telecommunications system of this kind in another possible mode of operation.

FIG. 4 illustrates a situation in which the downstream server SERVB will have activated a storage of a new set of service information elements SDB from the intermediate information server MNGS using a storage request SDWr(C1, Si,CGp) specifying an address defined by a conjunction of a call identifier C1 preliminarily received for said downstream server SERVB on the one hand with the session identifier Si on the other hand, thus an identifier CGp of a group of customers to which any intended recipient of this new set SDB of service information must belong to be authorized to obtain effective access thereto. In this exemplary embodiment, the downstream server SERVB will furthermore associate the group identifier CGp with this call identifier C1 in order to ensure that only customers belonging to the group of customers corresponding to this identifier CGp could receive the call identifier then referenced C1(Si,CGp). To the extent possible, the elements common with the preceding figure have been given the same reference signs in order to facilitate the understanding of the description. The downstream server SERVB is shown as being capable of drawing another downstream server SERVC into the session using a signaling link LSBC by means of which it could also send said other downstream server SERVC the call identifier C1(Si,CGp) which will enable this other downstream server SERVC to retrieve, by means of a read request SDRd(C1,Si,IdC) the set of information elements SDB stored for it upon a command from the server SERVB, on the preliminary condition that the identifier IdC of this other downstream server SERVC is truly included in the list of customer identifiers belonging to the group designated by the identifier CGp within the census table included in the intermediate information server MNGS. This other server SERVC could furthermore implement a similar procedure in order to retrieve information that has been preliminarily stored by the upstream server SERVA.

Figure 5:
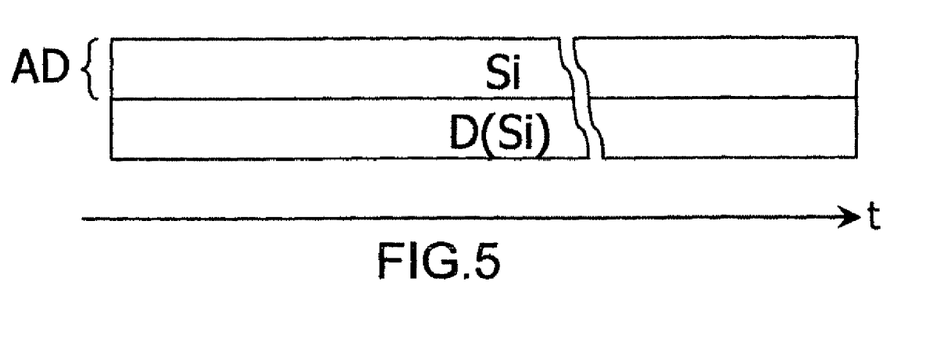
FIG. 5 is a timing diagram illustrating an addressing mode compliant with a variant of the invention.

FIG. 5 provides a very schematic illustration of an addressing system that can be used in modes of implementation of the invention described here above, in its most elementary form in which a set of service information elements D(Si) is referenced by means of an address AD which herein is exclusively constituted by the session identifier Si. Thus, as explained further above, this elementary form of the invention makes it possible, throughout the session considered, to ensure perenniality of service information D(Si) and therefore bring considerable advantage relative to the prior art.

As understood in the present description, a set of service information elements may be understood to be a group of information elements pertaining to a certain type of information, such as for example three coordinates in distinct directions forming a set of information elements used to provide information with precision to the intended recipient of this set on a spatial position of an object or of a user.

Figure 6:
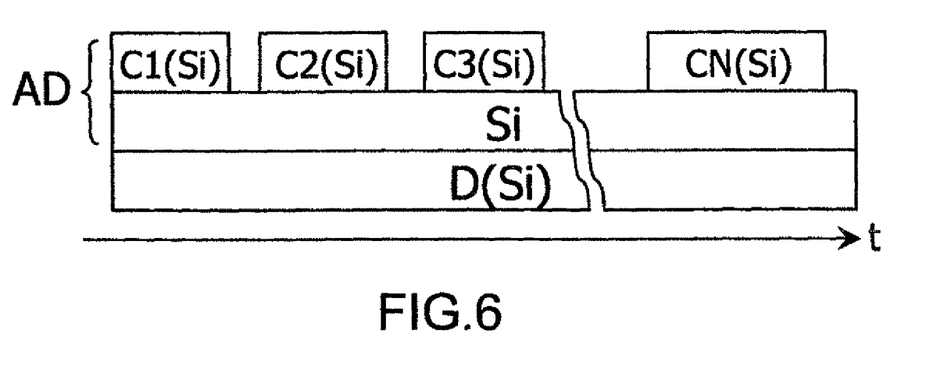
FIG. 6 is a timing diagram that illustrates a mode of addressing compliant with an advantageous mode of implementation of this variant of the invention.

FIG. 6 shows a variant of this addressing system used to obtain additional advantages in terms of flexibility since, in compliance with the above description, this variant, through the use of numerous call identifiers Cj(Si) (for j=1 to N) all linked to the signal session identifier Si as described further above, makes it possible to reference several sets of different information elements D(Si) possibly stored dynamically in time, each address AD of one of the sets being then built as a conjunction of the session identifier Si common to all the sets on the one hand and a call identifier Cj(Si) specific to each set on the other hand.

The above description illustrates not only the fact that an embodiment of the invention enables integrity, confidentiality and a perenniality of the service information elements pertaining to a communications session throughout the running of said session but also the fact that various variants of this invention may furthermore enable a dynamic enriching of these service information elements as well as the securing of these service information elements by an addressing that implements multiple call identifiers specific to the pieces of information considered and/or to their intended recipients.

An aspect of the disclosure aims to ensure a protection of the data stored in the intermediate unit against untimely access by third-party participants for whom this data is not intended.

Although the present disclosure has been described with reference to one or more examples, workers skilled in the art will recognize that changes may be made in form and detail without departing from the scope of the disclosure and/or the appended claims.

The invention claimed is:

1. A method for transmission of information between at least one first communications device and one second communications device, the method comprising:
   a preliminary step of defining a plurality of groups of customers,
   a step of addressing, during which at least one set of information elements intended for storage in an intermediate unit is referenced by an address including a usage session identifier, a usage session being defined as a sequence of successive activations of different communications devices,
   a step of storing at least one set of information elements in said intermediate unit distinct from the first and second communications devices,
   a step of designation by the first communications device of at least one group of customers authorized to access said set of information elements,
   at least one filtering step implemented by the intermediate unit in order to prevent any access to said set of information elements by a customer not belonging to said group of authorized customers,
      a step of generating a call identifier designed to form part of the address assigned to a set of information elements stored in the intermediate unit and to be temporarily related to a usage session identifier proper to the usage session considered, and
      a step of transmission of said call identifier via a signaling link set up between the first and second communications devices.

2. The method for the transmission of information according to claim 1, wherein any access to a set of information elements stored in the intermediate unit is preceded:
   by a step of identification of a sender of a request for access to said set of information elements during which said sender transmits to the intermediate unit at least one identifier of at least one group of customers to which the sender belongs, and
   a step of validation during which the group identifier transmitted by the sender of the request is compared with the identifiers of the groups of customers authorized to access said set of information elements during the designation step.

3. The method for the transmission of information according to claim 1, wherein the method includes a preliminary step of storage by the intermediate unit, and with reference to each group of customers defined during the definition step, of the customer identifiers included in the group considered, any access to a set of information elements stored in the intermediate unit being preceded:
   by a step of identification of a sender of a request for access to said set of information elements during which said sender transmits to the intermediate unit at least one identifier proper to this sender, and
   a step of validation during which the identifier of the sender of a request is compared with the identifiers of the customers included in the group or groups of customers authorized to access said set of information elements during the designation step.

4. The method for the transmission of information according to claim 1, wherein the method furthermore includes a step of qualification, during which there is designated at least one group of customers qualified to request a storage of a set of information elements within the intermediate unit, every storage of a set of information elements in the intermediate unit being preceded by:
   a step of identification of a sender of a request for storage of said set of information elements during which said sender transmits to the intermediate unit at least one identifier of at least one group of customers to which the sender belongs, and
   a step of validation during which the group identifier transmitted by the sender of a request is compared with the identifiers of the groups of customers authorized to store a set of information elements during the qualification step.

5. The method for the transmission of information according to claim 1, wherein the method furthermore includes a step of qualification, in which there is designated at least one group of customers qualified to request a storage of a set of information elements within the intermediate unit, every storage of a set of information elements in the intermediate unit being preceded by:
   a step of identification of a sender of a request for storage of said set of information elements during which said sender transmits to the intermediate unit at least one identifier proper to this sender, and
   a step of validation during which the identifier of the sender of the request is compared with the identifiers of the customers included in the group or groups of customers authorized to store a set of information elements during the qualification step.

6. The method for the transmission of information according to claim 1, wherein the method furthermore includes a step of encryption of the information included in the set of information elements to be stored.

7. The method according to claim 1, wherein the intermediate unit is constituted by a server capable of communicating, through a specific communications network, with different communications devices designed to be activated in the course of a usage session, and the step of generating the call identifier is executed by said server upon a request by one of said communications devices.

8. A telecommunications system capable of carrying out a transmission of information between at least one first communications device and one second communications device, the system comprising:

- an intermediate unit distinct from the first and second communications devices and provided with a database for storage of at least one set of information elements;
- means for receiving definitions of a plurality of groups of customers;
- addressing means in which at least one set of information elements intended for storage in said intermediate unit is referenced by an address including a usage session identifier, a usage session being defined as a sequence of successive activations of different communications devices;
- a filter implemented by the intermediate unit in order to prevent any access to said set of information elements by a user not belonging to a group of customers preliminarily designated by one of the communications devices as being authorized to access said set of information element,
- means for generating a call identifier designed to form part of the address assigned to a set of information elements stored in the intermediate unit and to be temporarily related to a usage session identifier proper to the usage session considered, and
- means for transmitting said call identifier via a signaling link set up between the first and second communications devices.

9. A data server device designed to be included in a telecommunications system capable of providing for a transmission of information between a first communications device and a second communications device, said data server comprising:

- a database for storage of at least one set of information elements;
- means for receiving definition of a plurality of groups of customers;
- addressing means in which at least one set of information elements intended for storage in said intermediate unit is referenced by an address including a usage session identifier, a usage session being defined as a sequence of successive activations of different communications devices;
- a filter capable of preventing any access to said set of information elements on the part of a customer not belonging to a population preliminarily designated by one of the communications devices as being authorized to access said set of information elements,
- means for generating a call identifier designed to form part of the address assigned to a set of information elements stored in the intermediate unit and to be temporarily related to a usage session identifier proper to the usage session considered, and
- means for transmitting said call identifier via a signaling link set up between the first and second communications devices.

* * * * *